United States Patent
Todd et al.

(10) Patent No.: US 7,436,790 B2
(45) Date of Patent: Oct. 14, 2008

(54) WIRELESS ACCESS POINT METHODS AND APPARATUS FOR REDUCED POWER CONSUMPTION AND COST

(75) Inventors: Terence D. Todd, Hamilton (CA); Dongmei Zhao, Hamilton (CA); Vytautas Robertas Kezys, Ancaster (CA)

(73) Assignee: Research In Motion Limited, Waterloo, Ontario (CA)

( * ) Notice: Subject to any disclaimer, the term of this patent is extended or adjusted under 35 U.S.C. 154(b) by 600 days.

(21) Appl. No.: 11/088,433

(22) Filed: Mar. 24, 2005

(65) Prior Publication Data

US 2005/0249137 A1    Nov. 10, 2005

Related U.S. Application Data (60) Provisional application No. 60/556,445, filed on Mar. 25, 2004.

(51) Int. Cl.
G08C 17/00    (2006.01)

(52) U.S. Cl. ........................ 370/311; 455/574

(58) Field of Classification Search ................ 370/311; 455/572, 574
See application file for complete search history.

(56) References Cited

U.S. PATENT DOCUMENTS 5,940,771 A * 8/1999 Gollnick et al. ............. 455/517
2004/0023679 A1 2/2004 Shoobridge
2004/0253996 A1 12/2004 Chen et al.

FOREIGN PATENT DOCUMENTS

EP    1473951 A2    11/2004

OTHER PUBLICATIONS

European Search Report for PCT Application #PCT/CA2005/000447, Jul. 26, 2005.

* cited by examiner

*Primary Examiner*—Temica M Beamer
(74) *Attorney, Agent, or Firm*—John J. Oskorep, Esq.

(57) ABSTRACT

In one illustrative technique, a contention-free period indication is communicated by a wireless access point (AP) (e.g. a battery-powered AP) to a plurality of mobile communication devices within a beacon of a superframe. The contention-free period indication identifies a duration of a contention-free period within which the mobile devices must refrain from communicating through the AP. During each contention period subframe of each superframe, information is communicated to and/or from the mobile devices through a wireless transceiver of the AP. During each power conservation subframe of each superframe, the wireless transceiver is placed into a power conservation mode which is at least part of the contention-free period. Alternatively, or in combination with the wireless transceiver being placed in the power conservation mode, information for the mobile devices may be communicated to and/or from another AP within each relay subframe of each superframe which is at least part of the contention-free period. Advantageously, power consumption may be reduced in the AP and/or a single radio interface may be utilized in the AP for communications. The durations of the power conservation subframe and the other subframes may be variably adjusted to tradeoff power savings with a real-time capacity requirement of the AP.

52 Claims, 5 Drawing Sheets

WIRELESS ACCESS POINT METHODS AND APPARATUS FOR REDUCED POWER CONSUMPTION AND COST

CROSS-REFERENCE TO RELATED APPLICATION

The present application claims priority to U.S. provisional patent application entitled "Mechanism For Improved Relaying Performance And Reduced Power Consumption In IEEE 802.11 Wireless Access Points" having Ser. No. 60/556,445 and a filing date of 25 Mar. 2004, which is hereby incorporated by reference herein.

BACKGROUND

1. Field of the Technology

The present application relates generally to wireless communication networks and devices, such as IEEE 802.11-compliant wireless local area networks (WLANs) and devices.

2. Description of the Related Art

Institute of Electrical and Electronics Engineers (IEEE) 802.11 Wireless Local Area Network (WLAN) compliant devices, such as 802.11a, 802.11b, 802.11g, dual-band, etc. devices, are becoming increasingly popular. Such IEEE 802.11-based WLANs are undergoing a massive deployment which will continue throughout the next decade. Locations that offer 802.11 WLAN connectivity are often referred to as "hotspots," where access points (APs) are utilized to provide wireless connections with mobile communication devices.

In these environments, Extended Service Set (ESS) mesh networking may provide the AP interconnection needed to backhaul traffic in and out of these hotspots and perform mesh-like traffic relaying. Solar and battery-powered wireless APs are becoming a reality in these environments as well. Thus, an 802.11 WLAN solution which accommodates ESS mesh networks and is applicable to battery-powered APs, such as those which operate under solar power, would be useful.

Some additional background and discussion regarding such wireless technologies are provided in the following publications: [1] T. Adachi and M. Nakagawa, "Capacity Analysis For A Hybrid Indoor Mobile Communication System Using Cellular and Adhoc Modes," The 11*th IEEE International Symposium on Personal, Indoor and Mobile Radio Communications (PIMRC'2000)*, volume 2, pages 767-771, 2000; [2] X. Wu, S H. G. Chan, and B. Mukherjee. Madf, "A Novel Approach To Add An Adhoc Overlay On A Fixed Cellular Infrastructure," *IEEE Wireless Communications and Networking Conference (WCNC'2000)*, volume 2, pages 549-554, 2000; [3] C. Qiao and H. Wu. Icar, "An Integrated Cellular And Adhoc Relay System," *Ninth International Conference on Computer Communications and Networks*, pages 154-161, 2000; [4] Y D. Lin and Y C. Hsu, "Multihop Cellular: A New Architecture For Wireless Communications," *IEEE INFOCOM* 2000, volume 3, pages 1273-1282, 2000; [5] B. S. Manoj R. Ananthapadmanabha and C. S. R Murthy, "Multihop Cellular Networks: The Architecture And Routing Protocols," 12*th IEEE International Symposium on Personal, Indoor and Mobile Radio Communications*, volume 2, pages G78-G82, 2001; [6] T. Rouse, I. Band, and S. McLaughlin, "Capacity And Power Investigation Of Opportunity Driver Multiple Access (ODMA) Networks In TDD-CDMA Based Systems," *IEEE International Conference on Communications*, 2002; [7] G. N. Aggelou and R. Tafazolli, "On The Relaying Capability Of Next Generation GSM Cellular Networks," *IEEE Personal Communications*, pages 40-47, February 2001; [8] M. J. Miller, W. D. List, and N. H. Vaidya, "A Hybrid Network Implementation To Extend Infrastructure Reach," Technical report, University of Illinois, January 2003; [9] R. S. Chang, W. Y. Chen, and Y. F. Wen, "Hybrid Wireless Network Protocols," *IEEE Transactions on Vehicular Technology*, 52(4):1099-1109, July 2003; [10] J. H. Yap, X. Yang, S. GhaheriNiri, and R. Tafazolli, "Position Assisted Relaying And Handover In Hybrid Ad Hoc WCDMA Cellular System," 13*th IEEE International Symposium on Personal, Indoor, and Mobile Radio Communications (PIMRC'2002)*, Lisbon, Portugal., pages 2194-2198, September 2002; [11] Y D. Lin, Y C Hsu, K W. Oyang, T C. Tsai, and D S. Yang. "Multihop Wireless IEEE 802.11 LANs: A Prototype Implementation," *IEEE International Conference on Communications (ICC'99)*, volume 3, pages 1568-1572, 1999; and [12] IEEE Standards Department, *IEEE Draft Standard Wireless* LAN. IEEE Press, 1996.

The state of the art reflects much activity that considers the inclusion of multihop relaying into wireless infrastructure networks. A variety of systems have been considered, and these systems often differ on the basis of whether the mobiles have multiple air interfaces, whether multihop infrastructure is present, and whether WLAN and/or cellular is being considered. See generally documents [1], [2], [3], [4], [5], [6], [7], and [8]. The system defined in document [1] uses multihop networking to enable communications whenever nodes are within range without use of the cellular infrastructure. This is also the objective in document [9] but, to maintain simplicity, a maximum of two ad hoc hops may be used between the end stations. In mobile assisted data forwarding (MADF) in document [2], special forwarding channels are allocated from resources used by the existing cellular network. These channels are then used for relaying traffic between cells. The approach in ICAR of document [3] is similar to this approach, but utilizes special preinstalled multihop relay stations to move traffic between cells. The multihop cellular system incorporates multihop relaying into the cellular network using the same air interface as that used by the cellular base stations (BSs) as in documents [4] and [5]. This concept is similar to the opportunity driven multiple access (ODMA) system proposed in document [6] and the system described in document [7]. In document [10], a mechanism referred to as "position assisted relaying" was proposed for WCDMA cellular networks with dual mode stations. In this scheme, a nearby station may relay transmissions for another when that station's cellular link becomes unusable. Finally, in document [8], a design is presented for achieving range extension using mobile station based multihop networking.

What are needed are techniques which may be used in IEEE 802.11 WLANs to enable wireless APs to reduce their power consumption (i.e. achieve improved power savings) and/or to perform multi-channel traffic relaying using a single radio interface.

SUMMARY

In one illustrative embodiment of the present application, a contention-free period indication is communicated by a wireless access point (AP) to a plurality of mobile communication devices within a beacon of a superframe. The contention-free period indication identifies a duration of a contention-free period within which the mobile devices must refrain from communicating through the AP. During a contention period subframe of the superframe, information is communicated to and/or from the mobile devices through a wireless transceiver of the AP. During a power conservation subframe of the superframe, the wireless transceiver of the AP is placed into a power conservation mode which is at least part of the contention-free period during which the mobile devices must refrain from communicating through the AP. In the power conservation mode, the wireless transceiver and other suitable subsystems (e.g. associated processors) of the AP are powered down or placed in a low power state. Alternatively, or in combination with the wireless transceiver being placed into the power conservation mode, information for the mobile devices may be communicated to and/or from another AP within a relay subframe of the superframe which is at least part of the contention-free period during which the mobile devices must refrain from communicating through the AP. Advantageously, power consumption may be reduced in the AP and/or a single radio interface in the AP may be utilized for communications.

The durations of the power conservation subframe and other subframes may be fixed during operation or, alternatively, variably adjusted to tradeoff power savings with an offered capacity of the AP. The offered capacity of the AP may be the minimum capacity through which to facilitate communications for the mobile devices currently being served.

Thus, in another illustrative embodiment of the present application, an offered capacity for facilitating communications for a plurality of mobile communication devices through the wireless AP is determined or selected. A communication duration (e.g. for a contention period and/or relay subframe) and a power conservation duration (e.g. for a power conservation subframe) for the AP are determined based on the selected capacity. The communication duration has a predefined relationship to the offered capacity such that, as the offered capacity increases, the communication duration increases. The power conservation duration also has a predefined relationship to the offered capacity such that, as the offered capacity increases, the power conservation duration decreases. Information for the mobile communication devices is communicated through the AP with use of a wireless transceiver within each communication subframe of each superframe for a plurality of superframes, where each communication subframe has the communication duration. On the other hand, the wireless transceiver is placed into a power conservation mode within each power conservation subframe of each superframe of the plurality of superframes, where each power conservation subframe has the power conservation duration. In one scenario, the steps of selecting the offered capacity and determining the subframe durations are performed prior to setup and operation of the AP. In another scenario, one or more processors of the AP are operative to perform either or both steps of selecting the offered capacity and determining the subframe durations. In this latter scenario, the durations of the subframes may be variably adjusted during operation of the AP to tradeoff power savings with the real-time capacity requirement.

DETAILED DESCRIPTION OF THE PREFERRED EMBODIMENTS

In one illustrative embodiment of the present application, a contention-free period indication is communicated by a wireless access point (AP) to a plurality of mobile communication devices within each beacon. The contention-free period indication identifies a duration of a contention-free period within which the mobile devices must refrain from communicating through the AP. During a contention period subframe of the superframe, information is communicated to and/or from the mobile devices through a wireless transceiver of the AP. During a power conservation subframe of the superframe, the wireless transceiver of the AP is placed into a power conservation mode which is at least part of the contention-free period during which the mobile devices must refrain from communicating through the AP. In the power conservation mode, the wireless transceiver and other suitable subsystems (e.g. associated processors) of the AP are powered down or placed in a power conservation state. Alternatively, or in combination with the wireless transceiver being placed into the power conservation mode, information for the mobile devices may be communicated to and/or from another AP within a relay subframe of the superframe which is at least part of the contention-free period during which the mobile devices must refrain from communicating through the AP. Advantageously, power consumption may be reduced in the AP and/or a single radio interface in the AP may be utilized for communications. The durations of the power conservation subframe and other subframes may be fixed during operation or, alternatively, variably adjusted to tradeoff power savings with an offered capacity of the AP. The offered capacity of the AP may be the minimum capacity through which to facilitate communications for the mobile devices currently being served. Thus, in another illustrative embodiment of the present application, an offered capacity for facilitating communications for a plurality of mobile communication devices through the wireless AP is determined or selected. A communication duration (e.g. for a contention period and/or relay subframe) and a power conservation duration (e.g. for a power conservation subframe) for the AP are determined based on the selected capacity. The communication duration has a predefined relationship to the offered capacity such that, as the offered capacity increases, the communication duration increases. The power conservation duration also has a predefined relationship to the offered capacity such that, as the offered capacity increases, the power conservation duration decreases. Information for the mobile communication devices is communicated through the AP with use of a wireless transceiver within each communication subframe of each superframe for a plurality of superframes, where each communication subframe has the communication duration. On the other hand, the wireless transceiver is placed into a power conservation mode within each power conservation subframe of each superframe of the plurality of superframes, where each power conservation subframe has the power conservation duration. In one scenario, the steps of selecting the offered capacity and determining the subframe durations are performed prior to setup and operation of the AP. In another scenario, one or more processors of the AP are operative to perform either or both steps of selecting the offered capacity and determining the subframe durations. In this latter scenario, the durations of the subframes may be variably adjusted during operation of the AP to tradeoff power savings with the real-time capacity requirement.

In the past decade there has been a huge proliferation of wireless local area networks (WLANs) which are operative in accordance with Institute of Electrical and Electronics Engineers (IEEE) 802.11 standards. As IEEE 802.11 connectivity becomes more ubiquitous, multihop communications will be increasingly utilized for range extension and coverage enhancement. In battery or solar powered implementations, power savings in the wireless access points (APs) is an important objective.

An IEEE 802.11-based wireless AP of the preferred embodiment is intended for use in multihop battery and solar/battery powered applications. These types of wireless APs have many practical applications and can be deployed inexpensively and very quickly to provide both outdoor and indoor coverage enhancement in environments such as campuses, building complexes, and other fast deployment scenarios. In an outdoor campus scenario, for example, very little traffic would normally be carried during the night and an AP design according to the present application can reduce the design and operating costs for these types of situations. The wireless AP of the preferred embodiment is also backward-compatible to a wide range of legacy IEEE 802.11 end stations and existing wired access points. Special techniques are utilized to achieve such compatibility and are described herein.

As indicated in the Background section, what are needed are techniques that can be used in IEEE 802.11 WLANs to enable wireless APs to significantly reduce their power consumption (i.e. achieve improved power savings) and/or to permit the wireless AP to perform multi-channel traffic relaying with use of a single radio interface. In the present application, a mechanism where both of these functions can be achieved in the presence of existing legacy IEEE 802.11 end stations (STAs) is provided.

Specifically, these objectives may be accomplished by advertising a contention-free (CF) period in beacons that are periodically transmitted by the wireless AP even though conventional CF stations are not present. Advertising a CF period serves to block legacy end stations from using the radio channel, since the advertised CF period sets the network allocation vectors (NAVs) in the end stations. This blocking permits the wireless AP to either enter a power conservation mode for all or part of the CF period, and/or tune its radio to a different IEEE 802.11 radio channel for the purpose of performing traffic relaying with another AP.

The originally-intended purpose (i.e. the IEEE 802.11 indicated purpose) for advertising a CF period in the beacons is to block stations from accessing the channel during the time that the AP (acting as an IEEE 802.11 point coordinator) polls CF-Pollable stations on the same channel. This originally-intended mechanism disables stations from attempting transmission with their normal distributed coordination function (DCF) transmission mechanism. The present techniques utilize this blocking mechanism to enable both power savings for the wireless AP and traffic relaying on a different channel with a single radio implementation. In the latter case, the present techniques can significantly improve the capacity of an access network without incurring the cost of a dual-radio design in the wireless APs.

Thus, the present techniques may provide single-radio, multi-channel traffic relaying in the presence of legacy IEEE 802.11 end stations. Otherwise, an AP might perform traffic relaying using a single-channel, single-radio AP implementation. This would create a performance bottleneck and a large portion of the radio channel capacity would be wasted. It is also less desirable to perform traffic relaying using a multi-channel, dual-radio AP implementation. That approach results in a more expensive and complex ESS mesh AP design. Another advantage of the present techniques is that power consumption is reduced, and this may be used to reduce the size and cost of battery and/or solar-power operated APs. There are currently no existing mechanisms that can be used to accomplish this in the presence of legacy end stations.

Figure 1:
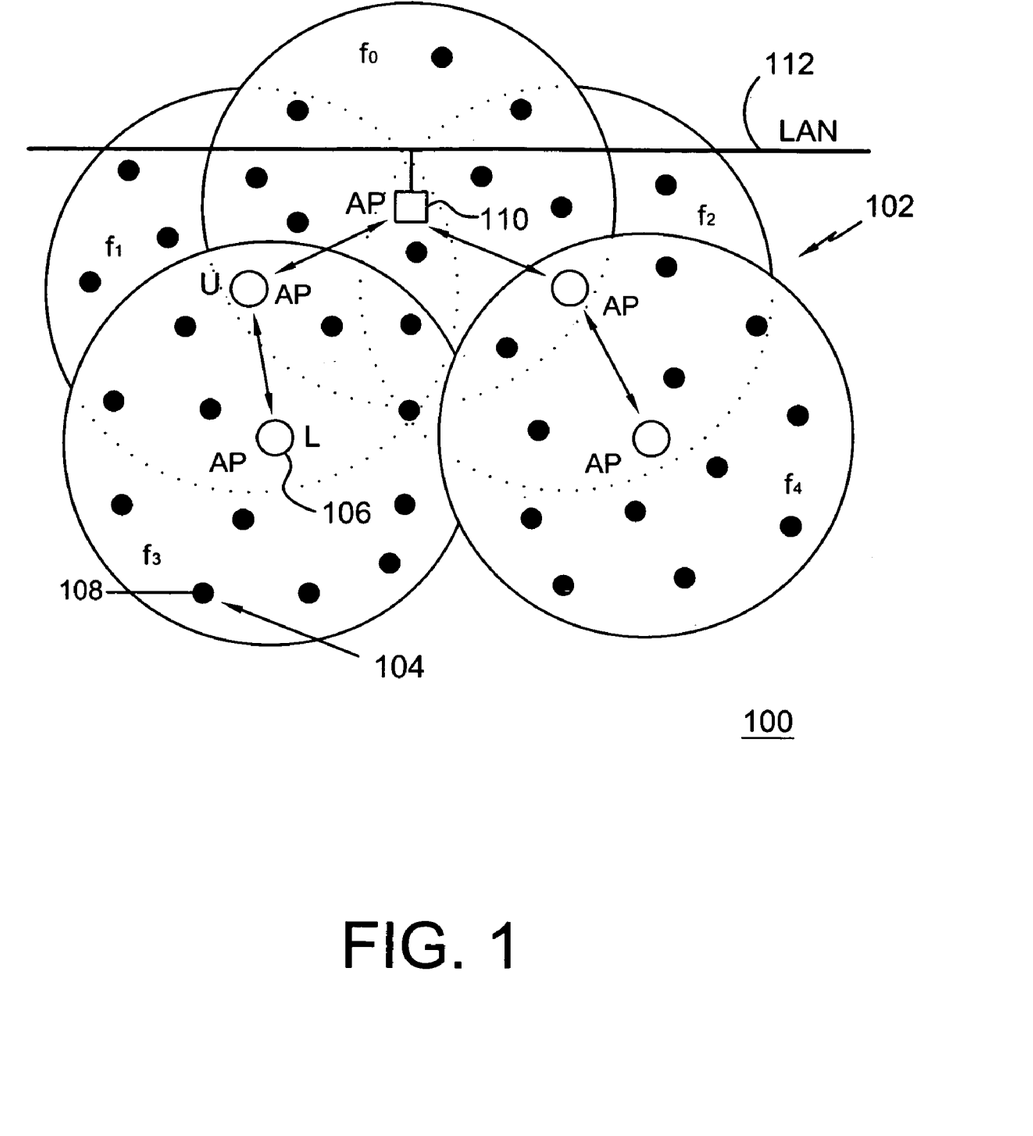
FIG. 1 is a top down illustrative representation of the structure of a wireless communication network or an 802.11-based wireless local area network (WLAN) having wireless access points (APs) of the present application.

In FIG. 1, an IEEE 802.11 WLAN of a communication system 100 is shown as providing a conventional AP 110 with a wired infrastructure connection 112 to a local area network (LAN) and to the Internet. A plurality of wireless APs 102 of the present application, such as a wireless AP 106, have also been installed in communication system 100. These wireless APs 102 serve to provide coverage extension and/or interconnection in their respective wireless coverage areas. Although four wireless APs 102 are shown in the drawing, any suitable number of wireless APs may be configured in the network. Wireless APs 102 are adapted to perform dual channel multihop relaying and, at the same time, accommodate conventional IEEE 802.11 end stations or mobile stations (MSs) 104 without any necessary protocol modifications being made to the MSs 104. Wireless APs 102 are also adapted to associate with a conventional IEEE 802.11-based wired AP 110. Wireless APs 102 may operate using limited power reserves, as is the case for battery and solar/battery powered wireless APs.

Figure 2:
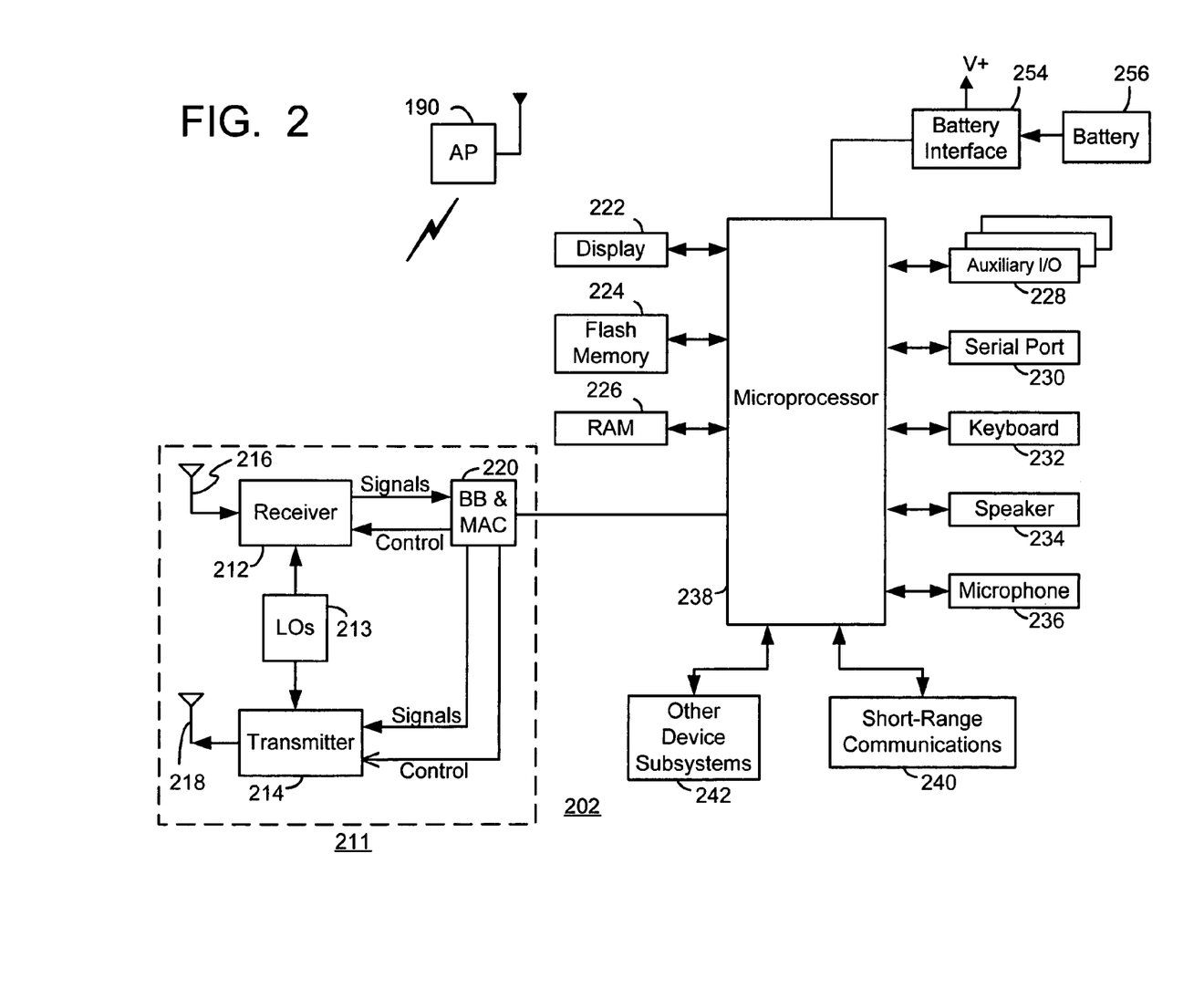
FIG. 2 is an exemplary schematic block diagram of a mobile communication device (e.g. a mobile station) which operates in the 802.11-based WLAN of FIG. 1.

Referring now to FIG. 2, electrical components of a typical mobile station (MS) 202 (one type of mobile communication device) which operates with APs and wireless APs 102 of the present application (FIGS. 1 and 3) will be described. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with AP 190 which may be a wireless AP of the present application. For communication with AP 190, mobile station 202 utilizes communication subsystem 211. Depending on the type of device, mobile station 202 may also be adapted to wirelessly communicate with other systems such as cellular telecommunication systems. With such configuration, mobile station 202 may be referred to as a "dual mode" mobile station. Although mobile station 202 may have separate and independent subsystems for these purposes, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile station 202 is intended to operate. In the present application, communication subsystem 211

(including its associated processor/processing components) are operative in accordance with IEEE 802.11 standards.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provides for receiver and transmitter control. Note that receiver 212 and transmitter 214 may share one or more antennas through an antenna switch (not shown in FIG. 2), instead of having two separate dedicated antennas 216 and 218 as shown.

Since mobile station 202 is a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (one type of processor or controller) that controls overall operation of mobile station 202. This control includes the communication formatting and operational techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
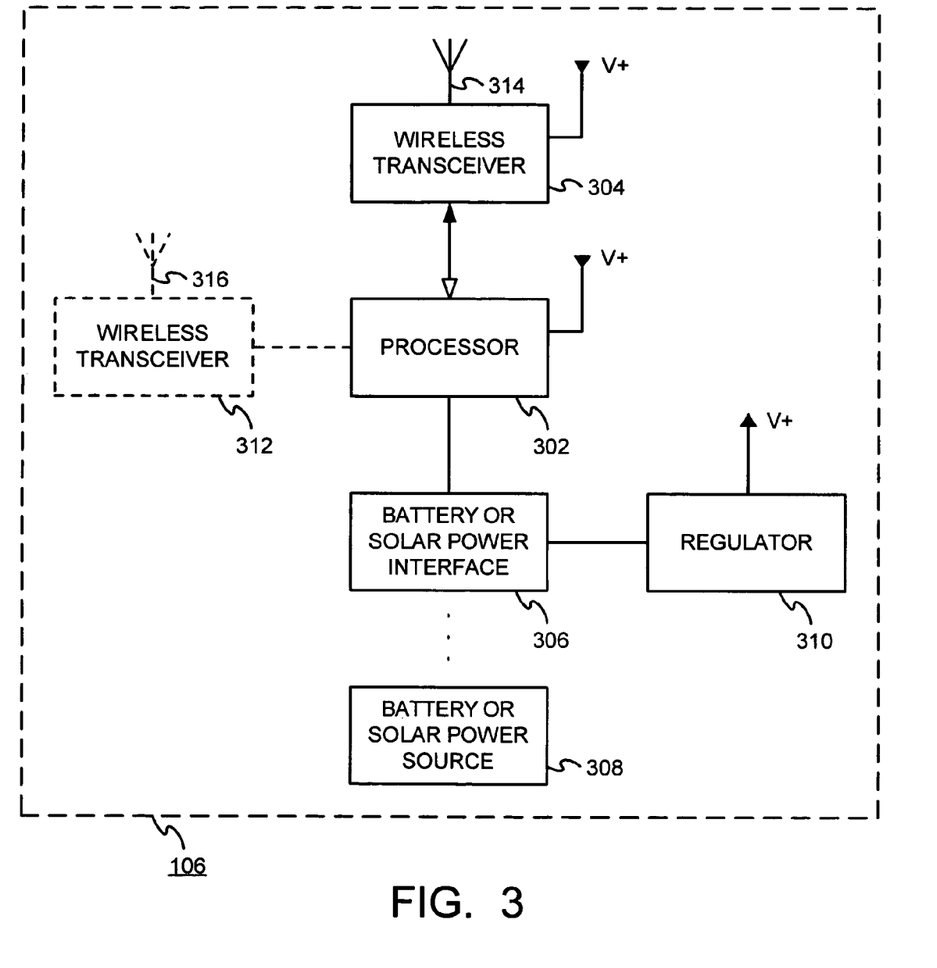
FIG. 3 is an exemplary schematic block diagram of an 802.11 wireless AP which operates in the 802.11-based WLAN of FIG. 1.

Referring now to FIG. 3, electrical components of a typical wireless access point (e.g. wireless AP 106 of FIG. 1) of the present application will be described. Wireless AP 106 of the present application includes one or more processors 302 (e.g. including a microprocessor), a wireless transceiver 304 for communicating information for a plurality of mobile stations, an antenna 314 coupled to wireless transceiver 304, a battery or solar power interface 306, a regulator 310 coupled to the battery or solar power interface 306, and a battery or solar power source 308. Regulator 310 produces a regulated voltage V+ for the other electrical components within wireless AP 106, being supplied electrical power through battery/solar power interface 306 from battery/solar power source 308. Most if not all components of wireless AP 106 (except perhaps for battery/solar power source 308) may be carried and/or contained within a housing of wireless AP 106. Wireless AP 106 operates in accordance with IEEE standards, in addition to providing the techniques of the present application. Wireless AP 106 also operates utilizing Extended Service Set (ESS) mesh networking techniques.

Wireless AP 106 is portable in nature due to having battery/solar power interface 306. Wireless AP 106 may be configured with an ESS mesh employing IEEE 802.11 operation, as well as being adapted for battery and/or solar power operation. When portable in nature, wireless AP 106 may be positioned and setup in any suitable area or environment and, as examples, wireless AP 106 may be found in areas around coffee shops, restaurants, hotels, airports, and company offices. Areas within which wireless AP 106 provides coverage may be referred to as a "hot spot". Mobile stations communicate wirelessly within and through wireless AP 106 through radio frequency (RF) communication links. Wireless AP 106 may communicate with other APs (e.g. other wireless APs or wired APs as in FIG. 1). The wired APs are typically wire-connected to the Internet using traditional Telco connections to provide higher bandwidth data communications.

Preferably, wireless AP 106 includes a single radio interface having wireless transceiver 304 and antenna 314. Thus, wireless transceiver 304 is utilized to communicate with both mobile stations and other APs as will be described herein. Alternatively, wireless AP 106 may include wireless transceiver 304 and antenna 314 for communicating with the mobile stations and one or more additional wireless transceivers 312 and antennas 316 (both shown in dashed lines) for communicating with other wireless APs. Wireless transceiver 304 and other components of wireless AP 106 (e.g. at least portions of processor 302) may be powered down in a power conservation mode of operation at appropriate time periods, which will also be described herein. Wireless AP 106 has a more specific operation as will be described earlier above as well as in relation to FIGS. 4-8 below.

Referring back to FIG. 1, a specific example of wireless AP operation is now discussed although different techniques and configurations may be utilized. In order to reduce cost and power consumption, each wireless AP 102 utilizes a single IEEE 802.11 wireless interface in the preferred embodiment. However, two or more wireless interfaces may be utilized in the wireless AP in other embodiments described.

In the present embodiment, a time-coordinated communication protocol is utilized with wireless APs 102 so that they can efficiently relay traffic, achieve good power saving performance and, at the same time, satisfy the IEEE 802.11 compatibility criterion for MSs 104. Each wireless AP 102 provides a HOME channel (or H channel) and acts as an AP to those MSs 104, such as MS 108, within its coverage range (shown as coverage circles in the figure). Wireless AP 106, which is labelled L in FIG. 1, for example, uses an H channel of frequency $f_3$. In addition, each wireless AP 102 has a RELAY channel (or R channel) which it uses to forward/download traffic to/from its parent AP 110 or wireless AP 102. In FIG. 1, the R channel for wireless AP 106 utilizes a frequency $f_1$. Each frequency of the R and H channel frequencies are shown to be different in FIG. 1 ($f_0$, $f_1$, $f_2$, $f_3$, and $f_4$), which may or may not be realizable depending upon the details of the site design and the version of IEEE 802.11 being adhered to. When this is the case, the channels may be reused subject to well-understood performance limitations.

Figure 4:
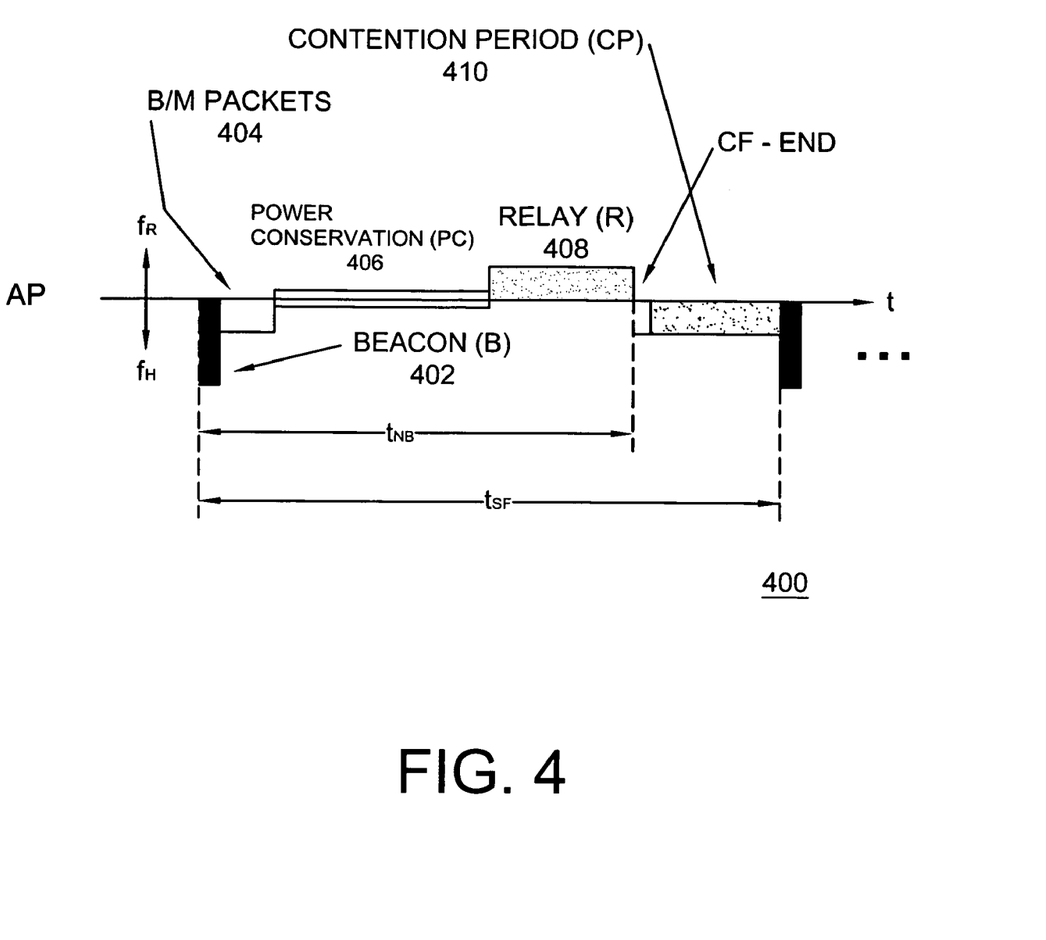
FIG. 4 is a format of a typical superframe utilized for communications in the 802.11-based WLAN of FIG. 1, where the superframe has a beacon, a power conservation subframe, a relay subframe, and a contention period subframe.

Referring now to FIG. 4, general communication formatting for the wireless APs of the present application (e.g. wireless AP 106 of FIGS. 1 and 3) will now be discussed with reference to the format of a superframe 400. Wireless AP transmission activity shown below the timeline indicates activities on the H channel, whereas activity shown above the timeline indicates activities on the R channel. As in conventional IEEE 802.11, the wireless AP establishes superframe 400 with a duration $t_{SF}$, which can span multiple beacon intervals. The basic wireless AP timeline of superframe 400 reveals three main subframes: a power conservation (PC) subframe 406, a relay (R) subframe 408, and a contention period (CP) subframe 410. The power conservation subframe may be referred to as a sleep mode subframe or a doze subframe. In the power conservation subframe 406, the wireless AP is in a power conservation mode where its radio and other suitable subsystems (e.g. associated processors) are switched into a lower power conserving state. For example, the wireless transceiver and/or one or more processors/controllers of the wireless AP may be powered down entirely or in large part in the power conservation mode. In relay subframe 408, the wireless AP has its radio tuned to the R channel and is relaying traffic to/from another AP. Finally, there is a DCF contention period subframe 410 during which the wireless AP has its radio active on the H channel. During this period, traffic is passed between the wireless AP and MSs using the normal IEEE 802.11 based DCF procedures. Note that relay subframe 408 and power conservation subframe may be referred to as part of a contention-free period of the AP. Also, since information for the MSs may be communicated within both relay subframe 408 and contention period subframe 410, these subframes 408 and 410 may be referred to as "communication subframes."

A beacon 402 is also transmitted on the H channel within the superframe 400 just prior to power conservation subframe 406. Note that a beacon may span multiple superframes. Following each beacon 402, any buffered broadcast or multicast traffic is transmitted prior to entering the power conservation mode (e.g. within B/M packets 404) in accordance with the relevant IEEE 802.11 standard. At the end of the relay subframe 408, the wireless AP transmits a CF-End packet on the H channel to signify that contention period subframe 410 is about to begin. In subsequent timelines of the superframe formats, these two periods will not be shown for clarity and brevity but they are indeed present in the preferred embodiment.

When beacon 402 is transmitted at the beginning of superframe 400, beacon 402 advertises the wireless AP as an IEEE 802.11 point coordinator (PC). It also specifies a contention-free period of duration equal to $t_{NB}$, which is equal to the sum of power conservation and relay subframes 406 and 408. In IEEE 802.11 standards, this may be provided as a duration value in the CFPMaxDuration field of the CF parameter set. This action serves to block all stations from accessing the H channel for a duration of time equal to $t_{NB}$, since the MSs will set their Network Allocation Vectors (NAV) to this value. Once this has been done, the wireless AP is then free to enter into the power conservation mode and/or to switch to the R channel as all MSs have been blocked from using the H channel. Note that all IEEE 802.11-compliant MSs are required to refrain from communicating over the H channel during this time period. Although compliance does not require an MS or AP to implement PCF functionality, it is a requirement that MSs set their NAV in accordance with the values of the parameters read from beacon frames. This technique may be referred to herein as "NAVblocking." This mechanism is used in conventional IEEE 802.11 to set the NAVs of non-PCpollable stations so that they do not interfere during the contention free period. It is also used in IEEE 802.11 e by the hybrid coordinator to subdue stations when operating controlled contention intervals.

When an MS comes within range of an IEEE 802.11-compliant AP, conventional scanning is used by the MS to find the AP. There are two types of conventional scanning: active and passive. In active scanning, the station transmits a Probe Request packet on the channel being scanned and a receiving AP may then respond with a Probe Response. In passive scanning, the MS listens on the channel to wait for a transmitted beacon packet from the AP. Preferably, the wireless AP of the present application supports the use of passive scanning. Although it may be utilized, active scanning may not always be reliable since a wireless AP may spend a significant fraction of its time either conserving power or relaying on a different channel. Although both types of scanning must be supported, the details of how scanning is performed is not specified by the IEEE 802.11 standards at this time. Thus, it is vendor-specific and varies depending upon the specific implementation.

Figure 5:
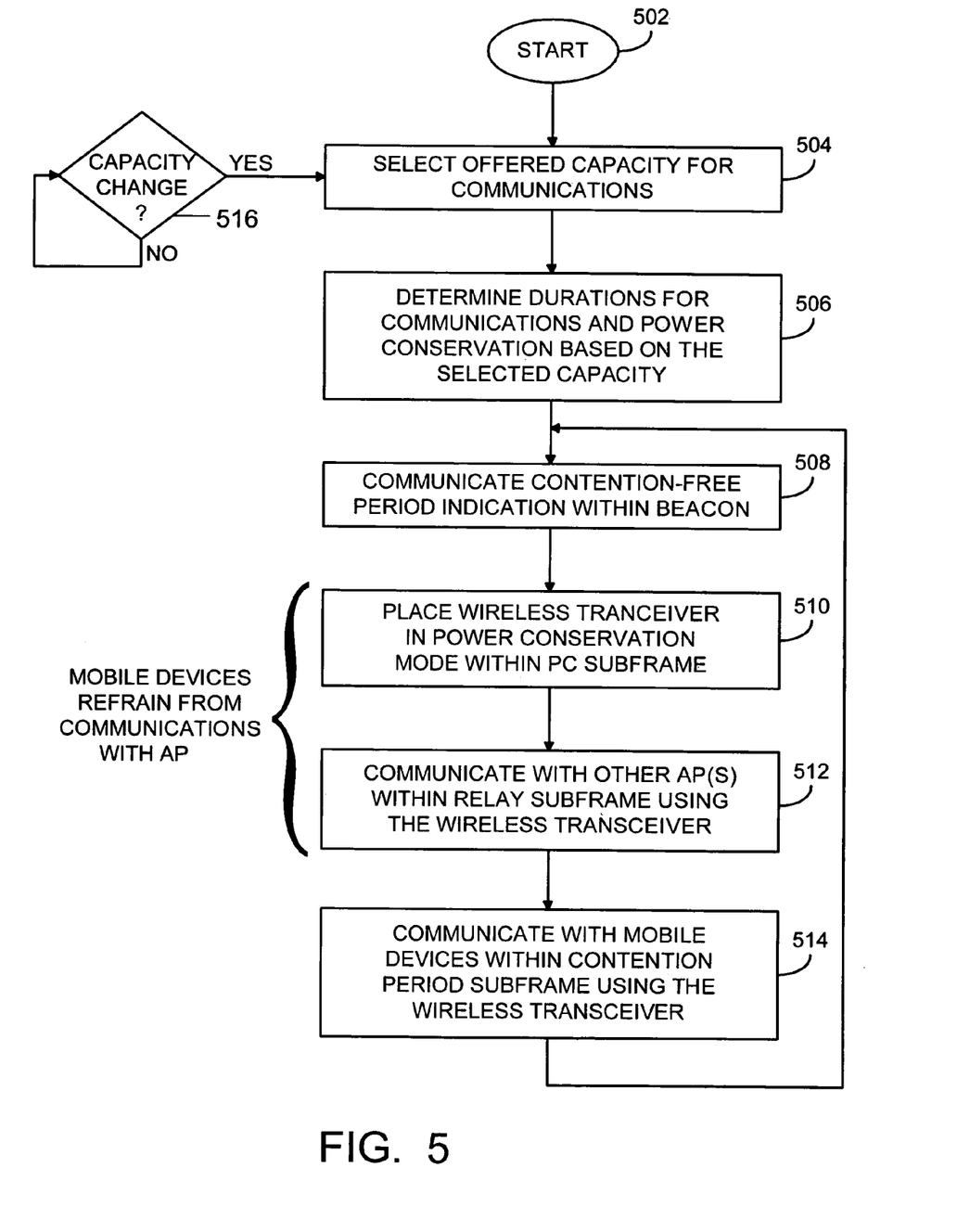
FIG. 5 is a flowchart describing a method of operating the AP of FIGS. 1 and 3.

FIG. 5 is a flowchart which describes a general method of operating a wireless access point (e.g. wireless AP 106 of FIGS. 1 and 3) for reduced power consumption and cost in accordance with the present application. This exemplary operation may utilize the framing structure shown and described earlier in relation to FIG. 4 or any other suitable framing structure. Note that, in the example of FIG. 5, the wireless AP is configured to utilize a single wireless transceiver interface to employ both power conservation techniques (e.g. during a power conservation subframe) and single radio interface techniques (e.g. communicating with other APs during a relay subframe). The method of FIG. 5 may be embodied in an AP of the present application with computer instructions which are executed by one or more processors of the AP. A computer program product of the present application includes computer-readable memory having computer instructions which are executable by one or more processors for performing the described method. Note further that a mobile device may employ a corresponding method related to that shown and described in relation to FIG. 5 using its one or more processors.

Beginning with a start block 502 of FIG. 5, an offered or required capacity for facilitating communications for a plurality of mobile communication devices through the wireless access point is determined or selected (step 504). The offered capacity may be determined or selected using any suitable technique, and may be based on one or more information items such as the number of currently-served mobile devices, a typical or average number of mobile devices served, a typical or average number of mobile devices served on a given day of week and/or time of day, the amount of data communications of currently-served mobile devices over a predetermined time period, a typical or average amount of data communications for mobile devices served, a typical or average amount of data communications for mobile devices served on a given day of week and/or time of day, etc. Next, a communication duration (e.g. for a contention period and/or relay subframe) and a power conservation duration (e.g. for a power conservation subframe) for the wireless access point are determined based on the selected capacity (step 506 of FIG. 5). The communication duration and the power conservation duration may be inversely proportional to each other, so that a tradeoff in the offered capacity and power savings for the AP may be achieved.

The communication duration is determined based on a predefined relationship with the offered capacity where, as the offered capacity increases, the communication duration correspondingly increases (or correspondingly decreases as the offered capacity decreases). For example, the communication duration may be directly proportional to the offered capacity. The power conservation duration is also determined based on a predefined relationship with the offered capacity where, as the offered capacity increases, the power conservation duration correspondingly decreases (or correspondingly increases as the offered capacity decreases). For example, the power conservation duration may be negatively proportional to the offered capacity. Note that, the power conservation duration may be determined directly from the offered capacity or indirectly from the communication duration. Similarly, the communication duration may be determined directly from the offered capacity or indirectly from the power conservation duration.

Preferably, the offered capacity is the same as or slightly greater than the minimum capacity for which to facilitate communications for the mobile devices currently being served. In this case, the communication duration is set to correspond to a minimum duration over which to achieve the minimum capacity requirement. The power conservation duration is therefore maximized or optimized for optimized power savings given the minimum capacity requirement.

Referring back to FIG. 5, a contention-free period indication is then communicated to the mobile devices from the wireless access point within a beacon of the superframe (step 508 of FIG. 5). The contention-free period indication identifies to the mobile devices a duration of a contention-free period during which the mobile devices must refrain from communicating through the wireless access point. The duration of the contention-free period is based on the duration of the power conservation subframe, the relay subframe, or both. In IEEE 802.11 standards, this may provided as a duration value in the CFPMaxDuration field of the CF parameter set of the beacon.

Next, a wireless transceiver (as well as any other suitable components) of the wireless access point is placed into a power conservation mode during the power conservation subframe (step 510 of FIG. 5). The power conservation subframe is at least part of the contention-free period during which the mobile devices must refrain from communicating through the wireless access point. Next, the wireless transceiver is switched out of the power conservation mode and tuned to a first channel where information is communicated to and/or from at least one other access point through the wireless transceiver within the relay subframe (step 512 of FIG. 5). The relay subframe is also at least part of the contention-free period during which the mobile devices must refrain from communicating through the wireless access point. Next, the wireless transceiver is tuned to a second channel such that information is communicated to and/or from the mobile communication devices through the wireless transceiver within the contention period subframe (step 514 of FIG. 5). The communication processing is repeated for the next superframe beginning again at step 508 of FIG. 5.

Note that the boundaries or durations of the subframes may be selected and set prior to operation of the wireless AP. Alternatively, the boundaries or durations of the subframes may be selected and set during operation of the wireless AP and performed by the wireless AP itself (e.g. by one or more processors of the wireless AP at regular intervals). If a change in the offered capacity is required as detected by the wireless access point during operations (step 516 of FIG. 5), then a new offered capacity for communications is determined or selected at step 504 and new durations for the communications and power conservations are determined at step 506. Again, the offered capacity is preferably the same as or slightly greater than the minimum capacity for which to facilitate communications for the mobile devices currently being served. In this case, the communication duration is set to correspond to a minimum duration over which to achieve the minimum capacity requirement. The power conservation duration is therefore maximized or optimized for optimized power savings given the minimum capacity requirement.

As described above, in the method of FIG. 5 the wireless AP is configured so as to employ both power conservation techniques (e.g. utilizing the power conservation subframe) and single radio interface techniques (e.g. utilizing the relay subframe). However, the wireless AP may be configured to employ power conservation techniques without employing single radio interface techniques, where one wireless transceiver is utilized for mobile device communication and the other wireless transceiver is utilized for AP communication. Alternatively, the wireless AP may be configured to employ single radio interface techniques without necessarily employing power conservation techniques. Other variations may be employed or devised as alternatives.

Referring back to FIG. 4, note that there are different alternatives to the ordering of the subframes. One choice is to provide the power conservation subframe before the relay subframe of the superframe as shown in FIG. 4. In this scenario, contention period subframe 410 may be set to have a fixed duration, while power conservation subframe 406 and relay subframe 408 have durations that are variable and depend on the offered capacity (e.g. the duration of power conservation subframe 406 decreases and the duration of relay subframe 408 increases as the offered capacity increases). Another choice is to reverse this ordering and provide the relay subframe before the power conservation subframe of the superframe. In this scenario, the relay subframe may be set to have a fixed duration, while the power conservation subframe and the contention period subframe have durations that are variable and depend on the offered capacity (e.g. the duration of the power conservation subframe decreases and the duration of the contention period increases as the offered capacity increases). Other framing structures are possible.

As described herein, an illustrative method of reducing power consumption in a wireless access point of the present application includes the steps of causing a contention-free period indication to be communicated to a plurality of mobile communication devices, the contention-free period indication identifying a duration of a contention-free period within which the mobile communication devices must refrain from communicating through the wireless access point; causing information to be communicated to and/or from the mobile communication devices through a wireless transceiver of the wireless access point during a contention period subframe of a superframe; and causing the wireless transceiver to be placed into a power conservation mode during a power conservation subframe of the superframe, where the power conservation subframe is at least part of the contention-free period. A computer program product of the present application includes computer-readable memory having computer instructions which are executable by one or more processors for performing the described method. A wireless access point of the present application comprises electrical components and a battery or solar power interface adapted for coupling to a battery or solar power source for supplying electrical power to the electrical components. The electrical components include at least one wireless transceiver, an antenna coupled to the at least one wireless transceiver, and one or more processors coupled to the at least one wireless transceiver. The one or more processors are operative to cause a contention-free period indication to be communicated to a plurality of mobile communication devices, the contention-free period indication identifying a duration of a contention-free period within which the mobile communication devices must refrain from communicating through the wireless access point; cause information to be communicated to and/or from the mobile communication devices through the wireless transceiver during a contention period subframe of a superframe; and cause the wireless transceiver to be placed into a power conservation mode during a power conservation subframe of the superframe, where the power conservation subframe is at least part of the contention-free period. The durations of the power conservation subframe and other subframes may be fixed or variably adjusted to tradeoff power savings with the real-time capacity requirement.

A method of operating a wireless access point with use of a single radio interface comprises the steps of causing a contention-free period indication to be communicated to a plurality of mobile communication devices, the contention-free period indication identifying a duration of a contention-free period within which the mobile communication devices must refrain from communicating through the wireless access point; causing information to be communicated to and/or from the mobile communication devices through a wireless transceiver of the wireless access point during a contention period subframe of a superframe; and causing information to be communicated to and/or from at least one other access point through the wireless transceiver during a relay subframe of the superframe, where the relay subframe is at least part of the contention-free period. A computer program product of the present application includes computer-readable memory having computer instructions which are executable by one or more processors for performing the described method. A wireless access point of present application comprises at least one wireless transceiver, an antenna coupled to the at least one wireless transceiver, and one or more processors coupled to the at least one wireless transceiver. The one or more processors are operative to cause a contention-free period indication to be communicated to a plurality of mobile communication devices, the contention-free period indication identifying a duration of a contention-free period within which the mobile communication devices must refrain from communicating through the wireless access point; cause information to be communicated to and/or from the mobile communication devices through a wireless transceiver of the wireless access point during a contention period subframe of a superframe; and cause information to be communicated to and/or from at least one other access point through the wireless transceiver during a relay subframe of the superframe, where the relay subframe is at least part of the contention-free period.

Another method of operating a wireless access point includes the steps of selecting an offered capacity for facilitating communications for a plurality of mobile communication devices through the wireless access point; determining a communication subframe duration and a power conservation subframe duration of the wireless access point based on the selected capacity, where the communication subframe duration increases as the selected capacity increases and the power conservation subframe duration decreases as the selected capacity increases; causing information to be communicated for the mobile communication devices through the wireless access point with use of a wireless transceiver within each communication subframe of each superframe for a plurality of superframes; and causing the wireless transceiver to be placed into a power conservation mode within each power conservation subframe of each superframe of the plurality of superframes. A computer program product of the present application includes computer-readable memory having computer instructions which are executable by one or more processors for performing the described method. A wireless access point of present application comprises at least one wireless transceiver, an antenna coupled to the at least one wireless transceiver, and one or more processors coupled to the at least one wireless transceiver. An offered capacity for facilitating communications for a plurality of mobile communication devices through the wireless access point is selected, and a communication subframe duration and a power conservation subframe duration of the wireless access point are determined based on the selected capacity. The communication subframe duration increases as the selected capacity increases and the power conservation subframe duration decreases as the selected capacity increases. The one or more processors of the wireless access point are operative to cause information to be communicated for the mobile communication devices through the wireless access point with use of a wireless transceiver within each communication subframe of each superframe for a plurality of superframes. The communication subframe may be or include a relay subframe, a contention period subframe, or both. The one or more processors are further operative to cause the wireless transceiver to be placed into a power conservation mode within each power conservation subframe of each superframe of the plurality of superframes. In one scenario, the steps of selecting the capacity and determining the subframe durations are performed prior to setup and operation of the wireless access point. In another scenario, the one or more processors of the wireless access point are operative to perform either or both steps of selecting the capacity and determining the subframe durations. In this latter scenario, the durations of the power conservation subframe and other subframes may be fixed or variably adjusted during operation to tradeoff power savings with the real-time capacity requirement.

What is claimed is:

1. A method in a wireless access point for use in reducing power consumption in the wireless access point, the method comprising the acts of:
   causing a contention-free period indication to be communicated to a plurality of mobile communication devices, the contention-free period indication identifying a duration of a contention-free period within which the plurality of mobile communication devices must refrain from communicating through the wireless access point;
   causing information to be communicated between the wireless access point and the mobile communication devices through a wireless transceiver of the wireless access point during a contention period subframe of a superframe; and
   causing the wireless transceiver to be placed into a power conservation mode during a power conservation subframe of the superframe during which no information is communicated between the wireless access point and any of the mobile communication devices, the power conservation subframe being at least part of the duration of the contention-free period.

2. The method of claim 1, wherein the act of causing the contention-free period indication to be communicated comprises the further act of transmitting the contention-free period indication within a beacon of the superframe.

3. The method of claim 1, wherein the act of causing the contention-free period indication to be communicated comprises the further act of transmitting the contention-free period indication within a CFPMaxDuration field of a beacon of the superframe.

4. The method of claim 1, further comprising:
   causing information for the mobile communication devices to be communicated between the wireless access point and another wireless access point within a relay subframe of the superframe during which no information is communicated between the wireless access point and any of the mobile communication devices, the relay subframe being part of the duration of the contention-free period.

5. The method of claim 1, further comprising:
   selecting an offered capacity for facilitating communications for the mobile communication devices through the wireless access point; and
   determining a power conservation mode duration of the power conservation subframe based on the selected capacity, the power conservation mode duration having a relationship with the selected capacity such that as the selected capacity increases, the power conservation mode decreases.

6. The method of claim 1, wherein the wireless access point operates in accordance with an IEEE 802.11-based standard.

7. The method of claim 1, wherein the power conservation subframe has a duration that is variable during operation of the wireless access point.

8. The method of claim 1, wherein the wireless access point comprises a battery-powered wireless access point.

9. A wireless access point, comprising:
   electrical components;
   a battery or solar power interface adapted for coupling to a battery or solar power source for supplying electrical power to the electrical components;
   the electrical components including:
      at least one wireless transceiver;
      an antenna coupled to the at least one wireless transceiver;
      one or more processors coupled to the at least one wireless transceiver;
      the one or more processors being operative to:
         cause a contention-free period indication to be communicated to a plurality of mobile communication devices, the contention-free period indication identifying a duration of a contention-free period within which the plurality of mobile communication devices must refrain from communicating through the wireless access point;
         cause information to be communicated between the wireless access point and the mobile communication devices through the wireless transceiver during a contention period subframe of a superframe; and
         cause the wireless transceiver to be placed into a power conservation mode during a power conservation subframe of the superframe during which no information is communicated between the wireless access point and any of the mobile communication devices, the power conservation subframe being at least part of the duration of the contention-free period.

10. The wireless access point of claim 9, wherein the one or more processors are further operative to cause the contention-free period indication to be communicated by transmitting the contention-free period indication within a beacon of the superframe.

11. The wireless access point of claim 9, wherein the one or more processors are further operative to cause information for the mobile communication devices to be communicated between the wireless access point and at least one other access point during a relay subframe of the superframe during which no information is communicated between the wireless access point and any of the mobile communication devices, the relay subframe being part of the duration of the contention-free period.

12. The wireless access point of claim 9, being operative in accordance with an IEEE 802.11-based standard.

13. The wireless access point of claim 9, wherein the power conservation subframe has a duration that is variable during operation of the wireless access point.

14. The wireless access point of claim 9, wherein the one or more processors are further operative to:
select an offered capacity for facilitating communications for the mobile communication devices through the wireless access point; and
determine a power conservation mode duration of the power conservation subframe based on the selected capacity, the power conservation mode duration having a relationship with the selected capacity such that as the selected capacity increases, the power conservation mode duration decreases.

15. A method of operating a wireless access point comprising the acts of:
causing a contention-free period indication to be communicated to a plurality of mobile communication devices, the contention-free period indication identifying a duration of a contention-free period within which the plurality of mobile communication devices must refrain from communicating through the wireless access point;
causing information to be communicated between the wireless access point and the mobile communication devices through a wireless transceiver of the wireless access point during a contention period subframe of a superframe; and
causing information to be communicated between the wireless access point and at least one other access point through the wireless transceiver during a relay subframe of the superframe during which no information is communicated between the wireless access point and any of the mobile communication devices, the relay subframe being at least part of the duration of the contention-free period.

16. The method of claim 15, wherein the act of causing the contention-free period indication to be communicated comprises the further act of transmitting the contention-free period indication within a beacon of the superframe.

17. The method of claim 15, further comprising:
causing the wireless transceiver to be placed into a power conservation mode during a power conservation subframe of the superframe during which no information is communicated between the wireless access point and any of the mobile communication devices, the power conservation subframe being part of the duration of the contention-free period.

18. The method of claim 15, wherein the wireless access point operates in accordance with an IEEE 802.11-based standard.

19. The method of claim 15, wherein the relay subframe has a duration that is variable during operation of the battery-powered wireless access point.

20. The method of claim 15, further comprising:
selecting an offered capacity for facilitating communications for the mobile communication devices through the wireless access point; and
determining a duration of the relay subframe based on the selected capacity, the duration being inversely proportional to the selected capacity.

21. The method of claim 15, wherein the act of causing the information to be communicated between the wireless access point and the mobile communication devices is performed over a first set of frequencies and the act of causing the information to be communicated between the wireless access point and the at least one other access point is performed over a second set of frequencies.

22. A wireless access point, comprising:
at least one wireless transceiver;
an antenna coupled to the at least one wireless transceiver;
one or more processors coupled to the at least one wireless transceiver;
the one or more processors being operative to:
cause a contention-free period indication to be communicated to a plurality of mobile communication devices, the contention-free period indication identifying a duration of a contention-free period within which the plurality of mobile communication devices must refrain from communicating through the wireless access point;
cause information to be communicated between the wireless access point and the mobile communication devices through a wireless transceiver of the wireless access point during a contention period subframe of a superframe; and
cause information to be communicated between the wireless access point and at least one other access point through the wireless transceiver during a relay subframe of the superframe during which no information is communicated between the wireless access point and any of the mobile communication devices, the relay subframe being at least part of the duration of the contention-free period.

23. The wireless access point of claim 22, wherein the one or more processors are further operative to cause the contention-free period indication to be communicated by transmitting the contention-free period indication within a beacon subframe of the superframe.

24. The wireless access point of claim 22, wherein the one or more processors are further operative to cause the wireless transceiver to be placed into a power conservation mode during a power conservation subframe of the superframe during which no information is communicated between the wireless access point and any of the mobile communication devices, the power conservation subframe being part of the duration of the contention-free period.

25. The wireless access point of claim 22, being operative in accordance with an IEEE 802.11-based standard.

26. The wireless access point of claim 22, wherein the relay subframe has a duration that is variable during operation of the wireless access point.

27. The wireless access point of claim 22, wherein the one or more processors are further operative to:
  select an offered capacity for facilitating communications for the mobile communication devices through the wireless access point; and
  determine a duration of the relay subframe based on the selected capacity, the duration being inversely proportional to the selected capacity.

28. The wireless access point of claim 22, wherein the one or more processors cause the information to be communicated between the wireless access point and the mobile communication devices over a first set of frequencies and cause the information to be communicated between the wireless access point and the at least one other access point over a second set of frequencies.

29. The wireless access point of claim 22, having a single radio interface comprising the wireless transceiver.

30. A method of operating a wireless access point comprising the acts of:
  selecting an offered capacity for communications for a plurality of mobile communication devices through the wireless access point;
  determining a communication duration and a power conservation duration of the wireless access point based on the selected capacity, the selected capacity having a relationship with the communication and power conservation durations such that, as the selected capacity increases, the communication duration increases and the power conservation duration decreases;
  causing information to be communicated between the wireless access point and the mobile communication devices with use of a wireless transceiver of the wireless access point within each communication subframe of each superframe for a plurality of superframes, each communication subframe having the communication duration; and
  causing the wireless transceiver to be placed into a power conservation mode within each power conservation subframe of each superframe of the plurality of superframes, each power conservation subframe having the power conservation duration during which no information is communicated between the wireless access point and any of the mobile communication devices.

31. The method of claim 30, wherein the wireless AP operates in accordance with IEEE 802.11-based standards.

32. The method of claim 30, wherein each communication subframe comprises a relay subframe for communicating with at least one other access point.

33. The method of claim 30, wherein each communication subframe comprises a contention period subframe for communicating with the mobile communication devices.

34. The method of claim 30, wherein at least one of the acts of selecting the offered capacity and determining the communication duration are performed prior to operation of the wireless access point.

35. The method of claim 30, wherein at least one of the acts of selecting the offered capacity and determining the communication duration are performed by one or more processors of the wireless access point during operation of the wireless access point.

36. A wireless access point, comprising:
  electrical components;
  a battery or solar power interface adapted for coupling to a battery or solar power source for supplying electrical power to the electrical components;
  the electrical components including:
    at least one wireless transceiver;
    an antenna coupled to the at least one wireless transceiver;
    one or more processors coupled to the at least one wireless transceiver;
    the one or more processors being operative to:
      cause information to be communicated for a plurality of mobile communication devices through the wireless transceiver within each communication subframe of each superframe for a plurality of superframes, each communication subframe having a communication duration determined based on an offered capacity for facilitating communications for the plurality of mobile communication devices, the communication duration having a relationship with the offered capacity such that as the offered capacity increases, the communication duration increases; and
      cause the wireless transceiver to be placed into a power conservation mode within each power conservation subframe of each superframe of the plurality of superframes, each power conservation subframe having a power conservation duration over which no information is communicated between the wireless access point and any of the mobile communication devices, the power conservation duration being determined based on the offered capacity for facilitating communications for the mobile communication devices and having a relationship with the offered capacity such that as the offered capacity increases, the power conservation duration decreases.

37. The wireless access point of claim 36, wherein the one or more processors are further operative to:
  select the offered capacity for facilitating communications for the mobile communication devices through the wireless access point; and
  determine the communication duration of the wireless access point based on the selected capacity.

38. The wireless access point of claim 36, wherein the one or more processors are further operative to:
  select the offered capacity for facilitating communications for the mobile communication devices through the wireless access point;
  determine the communication duration and power conservation duration of the wireless access point based on the selected capacity; and
  continue to repeat the selecting and determining during operation of the wireless access point.

39. The wireless access point of claim 36, wherein each communication subframe comprises a relay subframe for communicating with at least one other access point.

40. The wireless access point of claim 36, wherein each communication subframe comprises a contention period subframe for communicating with the mobile communication devices.

41. The method of claim 1, wherein the act of causing the wireless transceiver to be placed into the power conservation mode comprises the further act of powering down the wireless transceiver.

42. The method of claim 1, wherein the power conservation subframe precedes the contention period subframe in the superframe.

43. The method of claim 1, wherein the duration of the contention-free period is the same as the duration of the power conservation subframe.

44. The method of claim 4, wherein the duration of the contention-free period is the same as the sum of the durations of the power conservation subframe and the relay subframe.

45. The wireless access point of claim 9, wherein the one or more processors are further operative to cause the contention-free period indication to be communicated by transmitting the contention-free period indication within a CFPMaxDuration field of a beacon of the superframe.

46. The wireless access point of claim 9, wherein the one or more processors cause the wireless transceiver to be placed into the power conservation mode by powering down the wireless transceiver.

47. The wireless access point of claim 9, wherein the duration of the contention-free period is the same as the duration of the power conservation subframe.

48. The wireless access point of claim 11, wherein the duration of the contention-free period is the same as the sum of the durations of the power conservation subframe and the relay subframe.

49. The method of claim 15, wherein the act of causing the contention-free period indication to be communicated comprises the further act of transmitting the contention-free period indication within a CFPMaxDuration field of a beacon of the superframe.

50. The method of claim 15, wherein the duration of the contention-free period is the same as the duration of the relay subframe.

51. The method of claim 17, wherein the duration of the contention-free period is the same as the sum of the durations of the power conservation subframe and the relay subframe.

52. The wireless access point of claim 22, wherein the one or more processors are further operative to cause the contention-free period indication to be communicated by transmitting the contention-free period indication within a CFPMaxDuration field of a beacon of the superframe.

* * * * *